US 8,800,267 B2

(12) United States Patent
LaRose, Jr. et al.

(10) Patent No.: US 8,800,267 B2
(45) Date of Patent: Aug. 12, 2014

(54) CONTROL SYSTEM FOR MODULATING AN AIR MASS

(75) Inventors: Thomas LaRose, Jr., Howell, MI (US); John A. Catalogna, Commerce Township, MI (US); Paul Jasinkiewicz, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 374 days.

(21) Appl. No.: 13/362,869

(22) Filed: Jan. 31, 2012

(65) Prior Publication Data

US 2013/0192213 A1    Aug. 1, 2013

(51) Int. Cl.
  *F01N 3/00*  (2006.01)
(52) U.S. Cl.
  USPC ........................................................ 60/285
(58) Field of Classification Search
  CPC ... F02D 41/024; F02D 41/1446; F02D 41/18; F02D 41/0002; F02D 41/0035; F02D 2200/0804; F02D 2200/501; Y02T 10/42
  USPC ............................................ 60/285; 701/108
  See application file for complete search history.

(56) References Cited

U.S. PATENT DOCUMENTS

| | | | |
|---|---|---|---|
| 7,200,990 B2 * | 4/2007 | Gabrielsson et al. | 60/286 |
| 2001/0007191 A1 * | 7/2001 | Ohuchi et al. | 60/284 |
| 2004/0187480 A1 * | 9/2004 | Bidner et al. | 60/285 |
| 2006/0242945 A1 * | 11/2006 | Wang et al. | 60/277 |
| 2008/0151964 A1 * | 6/2008 | Hagen et al. | 374/152 |
| 2010/0318281 A1 * | 12/2010 | Santoso et al. | 701/109 |
| 2011/0041481 A1 * | 2/2011 | Fujita | 60/287 |

* cited by examiner

*Primary Examiner* — Thomas Denion
*Assistant Examiner* — Jason Shanske
(74) *Attorney, Agent, or Firm* — Cantor Colburn LLP

(57) ABSTRACT

A control system for an internal combustion engine is provided, and includes an exhaust gas conduit, an oxidization catalyst ("OC") device, a temperature sensor, an intake mass air flow sensor, an engine air intake mechanism, and a control module. The exhaust gas conduit is in fluid communication with, and is configured to receive an exhaust gas. The OC device is in fluid communication with the exhaust gas conduit. The OC device has an OC light-off temperature. The OC device is selectively activated to the light-off temperature to induce oxidization of the exhaust gas. The temperature sensor is situated in the exhaust stream upstream of the OC device. The temperature sensor monitors an exhaust gas temperature. The intake mass air flow sensor measures an air mass entering the internal combustion engine. The engine air intake mechanism is selectively activated to modulate the air mass entering the internal combustion engine.

20 Claims, 2 Drawing Sheets

CONTROL SYSTEM FOR MODULATING AN AIR MASS

FIELD OF THE INVENTION

Exemplary embodiments of the invention relate to a control system for an internal combustion engine of a vehicle and, more particularly, to a control system having an engine air intake mechanism that modulates an air mass entering the internal combustion engine.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter ("PM"). Catalyst compositions, typically disposed on catalyst supports or substrates, are provided in an engine exhaust system to convert certain, or all of these exhaust constituents into non-regulated exhaust gas components.

One type of exhaust treatment technology for reducing CO and HC emissions is an oxidation catalyst device ("OC"). The OC device includes a flow-through substrate and a catalyst compound applied to the substrate. The catalyst compound of the OC induces an oxidation reaction of the exhaust gases once the OC device has attained a threshold or light-off temperature. One type of exhaust treatment technology for reducing $NO_x$ emissions is a selective catalytic reduction ("SCR") device that may be positioned downstream of the OC device. An exhaust treatment technology in use for high levels of particulate matter reduction may include a particulate filter ("PF") device that traps particulate matter, which may be positioned downstream of the OC device and the SCR device. Regeneration is the process of removing the accumulated particulate matter from the PF device.

In a typical arrangement of an exhaust gas treatment system, the OC device is located upstream of the SCR device and the PF device. Thus, the amount of heat that is lost between the OC device and the PF device may be significant, especially in exhaust gas treatment systems having relatively long exhaust pipes or if the exhaust gas flow is relatively low. The amount of heat that is lost between the OC device and the SCR device may be significant as well. In one approach to increase the amount of heat to the SCR and the PF device, the temperature of the OC device is continually increased. However, this approach may cause thermal shocks to the exhaust gas treatment system when quickly increasing the exhaust gas temperature. Moreover, this approach may also heat the OC device above a threshold temperature the OC device is intended to be able to withstand.

In another approach, the exhaust gas flow is increased to drive the heat from the OC device to the SCR and the PF device. This results in an increased PF temperature. However, as the exhaust gas flow in the exhaust gas treatment system increases, the temperature of the OC device will in turn decrease. Specifically, the temperature of the OC device will eventually drop to below the light-off temperature. This results in the OC device being unable to reduce CO and HC in the exhaust gas. Accordingly, there is a need for an exhaust gas treatment system having increased heat supplied to the SCR device and the PF device, while still maintaining the OC device at the respective light-off temperature.

SUMMARY OF THE INVENTION

In one exemplary embodiment of the invention, a control system for an internal combustion engine is provided, and includes an exhaust gas conduit, an oxidization catalyst ("OC") device, a temperature sensor, an intake mass air flow sensor, an engine air intake mechanism, and a control module. The exhaust gas conduit is in fluid communication with, and is configured to receive exhaust gas. The OC device is in fluid communication with the exhaust gas conduit. The OC device has an OC light-off temperature. The OC device is selectively activated to the light-off temperature to induce oxidization of the exhaust gas. The temperature sensor is situated in the exhaust stream upstream of the OC device. The temperature sensor monitors an exhaust gas temperature. The intake mass air flow sensor measures an air mass entering the internal combustion engine. The engine air intake mechanism is selectively activated to modulate the air mass entering the internal combustion engine. The control module is in communication with the temperature sensor, the intake mass air flow sensor, and the engine air intake mechanism. The control module has a memory for storing a threshold exhaust flow rate. The control module includes control logic for monitoring the intake mass air flow sensor and calculating an exhaust flow rate based on the air mass. The control module includes control logic for monitoring the temperature sensor for the exhaust gas temperature and calculating a temperature of the OC device based on the exhaust gas temperature at the OC device. The control module includes control logic for determining if the temperature of the OC device is a threshold amount above the light-off temperature of the OC device. The control module includes control logic for activating the engine air intake mechanism to modulate the air mass if the exhaust flow rate is below the threshold exhaust flow rate and if the OC device is the threshold amount above the light-off temperature of the OC device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
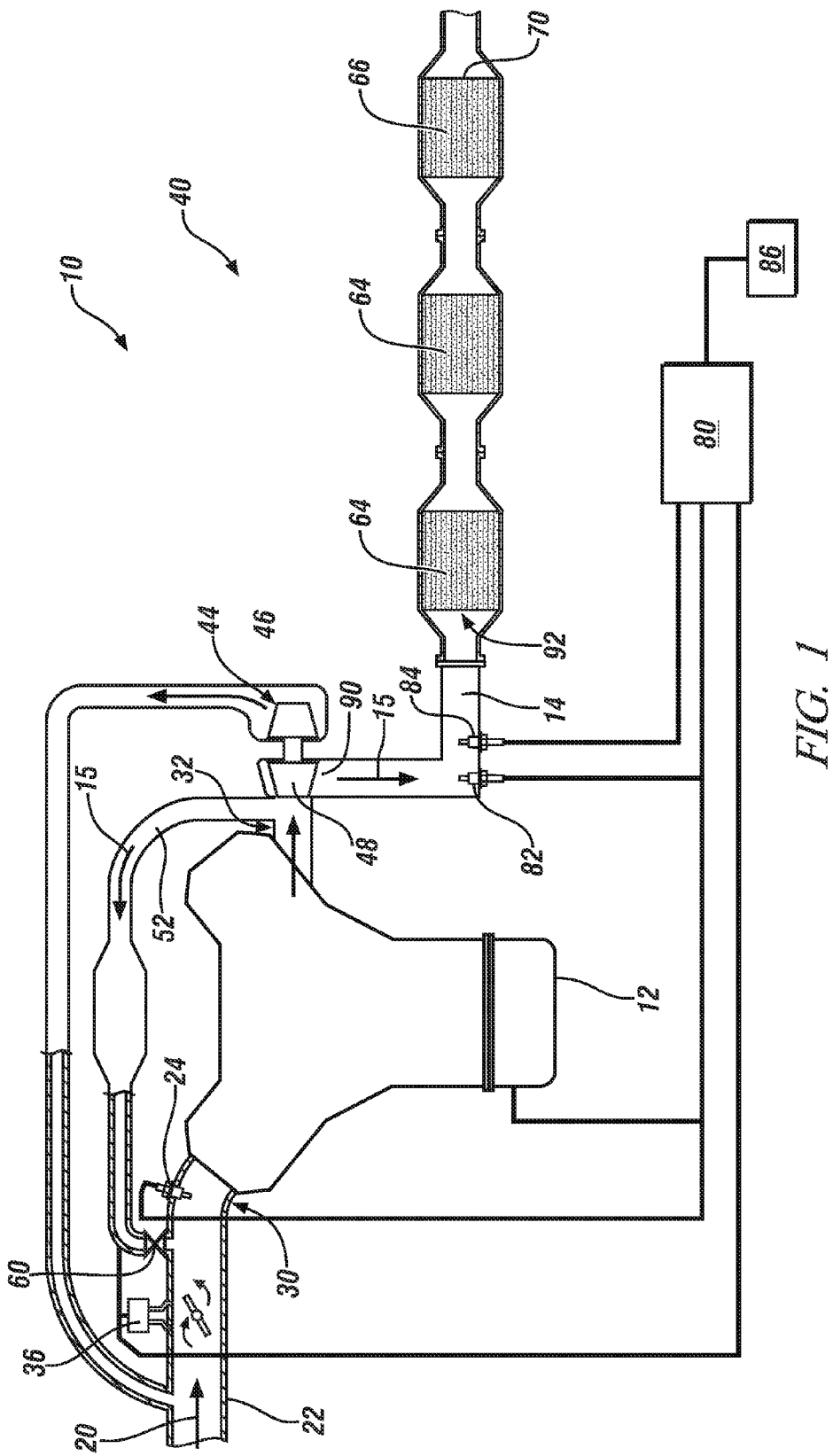
FIG. 1 is an exemplary illustration of a control system for an engine.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to a control system 10 for an internal combustion (IC) engine 12 of a vehicle (not shown in FIG. 1). The engine 12 is configured to receive an intake air 20 from an air intake passage 22. The intake air passage 22 includes an intake mass air flow sensor 24 for determining the intake air mass of the engine 12. In one embodiment, the intake mass air flow sensor 24 may be either a vane meter or a hot wire type intake mass air flow sensor, however, it is to be understood that other types of sensors may be used as well. The engine 12 is connected to an intake manifold 30 and an exhaust manifold 32. The intake manifold 30 is fluidly connected to the air intake passage 22 and a throttle valve 36. The throttle valve 36 regulates or modulates the amount of the intake air 20 that enters the engine 12. In one exemplary embodiment, the throttle valve 36 may be a butterfly valve, however it is to be understood that other types of valve may be used as well. The exhaust manifold 32 is connected to an exhaust gas conduit 14 that is part of an exhaust gas treatment system 40. In FIG. 1, the exhaust gas conduit 14, which may comprise several segments, transports exhaust gas 15 from the IC engine 12 to the various exhaust treatment devices of the exhaust gas treatment system 40.

The control system 10 may also include a boosting device for the engine 12 such as a turbocharger 44. The turbocharger 44 includes a compressor 46 that is arranged within and is in fluid communication with the air intake passage 22. The compressor 46 may be driven by a turbine 48 arranged in the exhaust conduit 14. A shaft 50 connects the compressor 46 with the turbine 48, where the turbine 48 drives the shaft 50. The control system 10 may also include one or more engine gas recirculation ("EGR") passages 52 for recirculating at least a portion of the exhaust gas 15 to the air intake passage 22. In the exemplary embodiment as shown, the EGR passage 52 is shown upstream of the turbine 48, however it is to be understood that the EGR passage 52 may be located downstream of the turbine 48 as well. An amount or rate of exhaust gas 15 that enters the air intake passage 22 may be controlled or modulated by an EGR valve 60.

The exhaust gas treatment system 40 described herein can be implemented in various engine systems that may include, but are not limited to, diesel engine systems, gasoline direct injection systems, and homogeneous charge compression ignition engine systems. In the embodiment as illustrated, the exhaust gas treatment system devices include an oxidation catalyst device ("OC") 62, a selective catalytic reduction device ("SCR") 64, and a particulate filter device ("PF") 66. As can be appreciated, the exhaust gas treatment system of the present disclosure may include various combinations of one or more of the exhaust treatment devices shown in FIG. 1, and/or other exhaust treatment devices (not shown), and is not limited to the present example.

The OC device 62 may include, for example, a flow-through metal or ceramic monolith substrate that is packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum ("Pt"), palladium ("Pd"), rhodium ("Rh") or other suitable oxidizing catalysts, or combination thereof. The OC device 62 is useful in treating unburned gaseous and non-volatile HC and CO, which are oxidized to form carbon dioxide and water. The OC device 62 includes a light-off temperature that represents the temperature where the OC device 62 oxidizes unburned gaseous and non-volatile HC and CO and forms carbon dioxide and water. In one exemplary embodiment, the light-off temperature of the OC device 62 is about 250° C.

The SCR device 64 may be disposed downstream of the OC device 62. In a manner similar to the OC device 62, the SCR device 64 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia. The SCR device 64 may also include a respective light-off temperature that represents the temperature where the SCR device 64 converts $NO_x$ constituents in the exhaust gas 15 into nitrogen. In one exemplary embodiment, the light-off temperature of the SCR device 64 is about 200° C.

The PF device 66 may be disposed downstream of the SCR device 64. The PF device 66 operates to filter the exhaust gas 15 of carbon and other particulates. In various embodiments, the PF device 66 may be constructed using a ceramic wall flow monolith filter 70 that may be packaged in a shell or canister constructed of, for example, stainless steel, and that has an inlet and an outlet in fluid communication with exhaust gas conduit 14. The ceramic wall flow monolith filter 70 may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 15 entering the filter 70 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is appreciated that the ceramic wall flow monolith filter is merely exemplary in nature and that the PF 66 may include other filter devices such as wound or packed fiber filters, open cell foams, sintered metal fibers, etc. The increase in exhaust backpressure caused by the accumulation of particulate matter in the monolith filter 70 typically requires that the PF device 66 is periodically cleaned, or regenerated. Regeneration involves the oxidation or burning of the accumulated carbon and other particulates in what is typically a high temperature environment (>600° C.).

A control module 80 is operably connected to and monitors the engine 12 and the control system 10 through a number of sensors. Specifically, FIG. 1 illustrates the control module 80 in communication with an oxygen sensor 82, a temperature sensor 84, a vehicle speed sensor 86, the intake air mass airflow sensor 24, the throttle valve 36, and the EGR valve 60. The oxygen sensor 82 is located upstream of the OC device 62 and at an outlet 90 of the turbine 48. The oxygen sensor 82 is configured for sending a signal to the control module 80 indicating an oxygen concentration in the exhaust gas 15. The temperature sensor 84 sends electrical signals to the control module 80 that indicate the temperature in the exhaust gas conduit 14 at the outlet 90 of the turbine 48. That is, the temperature sensor 84 indicates the upstream temperature of the OC device 62. The vehicle speed sensor 86 indicates the speed of a vehicle (not shown in FIG. 1). For example, in one embodiment, the vehicle speed sensor 86 determines the rotational speed of a driveshaft (not shown), where a transmission (not shown) transfers engine torque to the driveshaft which drives the wheels of the vehicle.

The control module 80 may be an engine control unit ("ECU") or a powertrain control module ("PCU") that includes control logic for calculating an exhaust flow rate located within the exhaust gas conduit 14 upstream of the OC device 62. The exhaust flow rate is based on the intake air mass of the engine 12, which is measured by the intake air mass airflow sensor 24 as well as a fuel mass flow of the engine 12. Specifically, the exhaust flow of the engine 12 is calculated by adding the intake air mass of the engine 12 and the fuel mass flow of the engine 12. The fuel mass flow is measured by summing the total amount of fuel injected into the engine 12 over a given period of time. The fuel mass flow is added to the air mass flow rate to calculate the exhaust flow rate of the engine 12. The exhaust flow rate represents the exhaust flow rate at an inlet 92 of the OC device 62.

The control module 80 includes control logic for determining the temperature of the OC device 62 based on the temperature sensor 84. The control module 80 further includes control logic for determining if the temperature of the OC device 62 is a threshold amount above the respective light-off temperature of the OC device 62. Specifically, for example, in one embodiment if the light-off temperature of the OC device 62 is about 250° C., then the threshold amount above the respective light-off temperature of the OC device 62 would be about 30° C. Having the OC device 62 above the light-off temperature ensures that modulating the exhaust flow rate within the exhaust gas conduit 14 will not cause the OC device 62 to drop below the light-off temperature.

The control module 80 includes control logic for modulating the exhaust gas flow rate within the exhaust gas conduit 14 based on at least the exhaust flow rate calculated at the inlet 92 of the OC device 62 and the upstream temperature of the OC device 62. Modulation of the exhaust gas flow rate may be referred to as a thermal modulation mode ("TMM"). Specifically, the control module 80 includes control logic for modulating the exhaust gas flow rate in the event the calculated exhaust flow rate is below a threshold exhaust flow rate value, and if the OC device 62 is the threshold amount above the light-off temperature. A memory of the control module 80 stores values for the respective threshold exhaust flow rate and the light-off temperature of the OC device 62. In one exemplary embodiment, the threshold exhaust flow rate is at or below about 200 kg/hr to activate thermal modulation mode.

The control module 80 may modulate the exhaust gas flow rate within the exhaust gas conduit 14 using an engine air intake mechanism. The engine air intake mechanism may be the throttle valve 36 or the EGR valve 60. The throttle valve 36 regulates or modulates the amount of the intake air 20 that enters the engine 12. That is, the throttle valve 36 selectively modulates or oscillates the intake air 20 from the air intake passage 22 into the engine 12, which in turn creates oscillations in the flow rate of the exhaust gas 15. In another approach, the exhaust gas flow rate is modulated by an engine air intake mechanism that is the EGR valve 60. That is, the EGR valve 60 selectively modulates the amount of the exhaust gas 15 that is recirculated back into the engine 12.

Modulation of the exhaust gas 15 may be accomplished using several different approaches. In one approach, the exhaust flow rate may be modulated using the intake mass air flow sensor 24. Specifically, in a closed-loop approach using the intake mass air flow sensor 24, the control module 80 includes control logic for monitoring the intake mass air flow sensor 24. The control module 80 includes control logic for determining the intake air mass of the engine 12 based on the intake mass air flow sensor 24. The control module 80 also includes control logic for activating the engine air intake mechanism (i.e. either the throttle valve 36 or the EGR valve 60) to modulate the intake air mass, where modulation is based on the current value of the intake air mass of the engine 12. For example, in one embodiment, the control module 80 may include control logic for periodically oscillating the intake air mass between 400 mg/Hub and 500 mg/Hub.

In another approach, the control module 80 includes control logic for controlling the engine intake air mechanism (i.e. either the throttle valve 36 or the EGR valve 60) based on a specific duty cycle. For example, in one embodiment, the control module 80 includes control logic for modulating the airflow based on a duty cycle where the throttle valve 36 or the EGR valve 60 is open at about 50% of the time.

In yet another approach, the exhaust gas flow rate is modulated using either the oxygen sensor 82 or the temperature sensor 84 with a closed-loop approach. Specifically, in one approach using the oxygen sensor 82, the control module 80 includes control logic for monitoring the oxygen sensor 82 for the oxygen concentration in the exhaust gas 15. The control module 80 further includes control logic for calculating the intake air mass of the engine 12 based on the oxygen concentration in the exhaust gas 15. The control module 80 also includes control logic for modulating the engine air intake mechanism (i.e. either the throttle valve 36 or the EGR valve 60) based on the intake air mass of the engine 12 calculated from the oxygen concentration. Alternatively, in another embodiment, the control module includes control logic for monitoring the temperature sensor 84 in the exhaust gas 15 for an exhaust gas temperature. The control module 80 then calculates the intake air mass of the engine 12 based on the exhaust gas temperature. The control module 80 modulates the engine air intake mechanism based on the intake air mass of the engine 12, where the intake air mass of the engine 12 is based on the temperature of the exhaust gas 15.

The control module 80 may also include a protective feature which monitors the temperature sensor 84 and determines the temperature of the OC device 62. The control module 80 includes control logic for ensuring that the temperature of the OC device 62 does not drop below the respective light-off temperature. Specifically, in the event that the control module 80 determines that the temperature of the OC device 62 is within a specific range of the light-off temperature, then the control module 80 may deactivate the thermal modulation mode and the exhaust gas 15 is no longer modulated or oscillated.

In addition to the temperature of the OC device 62 and the exhaust flow rate, the control module 80 may also include control logic for modulating the exhaust flow based on other variables as well. For example, the control module 80 includes control logic for monitoring the vehicle speed sensor 86 to determine vehicle speed. In the event that the vehicle speed drops below a threshold speed, then the control module 80 may include control logic for activating the thermal modulation mode. For example, in one embodiment the control module 80 includes control logic for activating the thermal modulation mode if the vehicle speed is at or below about 16 km/hr (about 10 mph).

In another example, the control module 80 includes control logic for monitoring the engine 12 for engine fueling. Specifically, the control module 80 includes control logic for monitoring the engine 12 for engine RPM and fueling. The fueling of the engine 12 is the amount of fuel that is introduced into the engine 12 by a fuel injector (not illustrated in FIG. 1). In one embodiment, the fueling of the engine may be measured in cubic centimeters per Hub (where Hub represents the power stroke per revolution). The memory of the control module 80 includes an engine calibration table that includes engine speed (RPM) versus engine fueling (cc/Hub). In one exemplary embodiment, the control module 80 includes control logic for activating the thermal modulation mode if the engine fueling is below a threshold value, which may be at or below 30 cc/Hub.

In yet another example, the control module 80 includes control logic for monitoring the engine 12 for engine torque. Specifically, the control module 80 includes control logic for monitoring the engine 12 for engine RPM and engine torque. The memory of the control module 80 may include a calibration table for engine torque versus engine RPM. In one exemplary embodiment, the control module 80 includes control logic for activating the thermal modulation mode if the engine torque is below a threshold value such as, for example 50 Nm.

The control module 80 may modulate the exhaust flow rate within the exhaust gas conduit 14 for a variety of different reasons. For example, in one embodiment, the thermal modulation mode may be activated to help create elevated temperatures in the PF device 66 during regeneration. That is, in one embodiment the control module 80 includes control logic for activating the thermal modulation mode during regeneration of the PF device 66. The increased exhaust flow rate also creates a higher level of oxygen in the exhaust gas 15, which in turn increases the amount of oxidation or burning of the accumulated carbon and other particulates in the PF device 66 during regeneration as well. This in turn improves fuel economy and emissions for the engine 12, as modulation of the exhaust flow rate translates into less time needed for regeneration of the PF device. In another embodiment, the control module 80 includes control logic for activating thermal modulation mode if the SCR device 64 has not reached or attained the respective light-off or threshold temperature. The thermal modulation mode is activated to create elevated temperatures in the SCR device 64, which in turn aids the SCR device 64 in reaching light-off more quickly.

Figure 2:
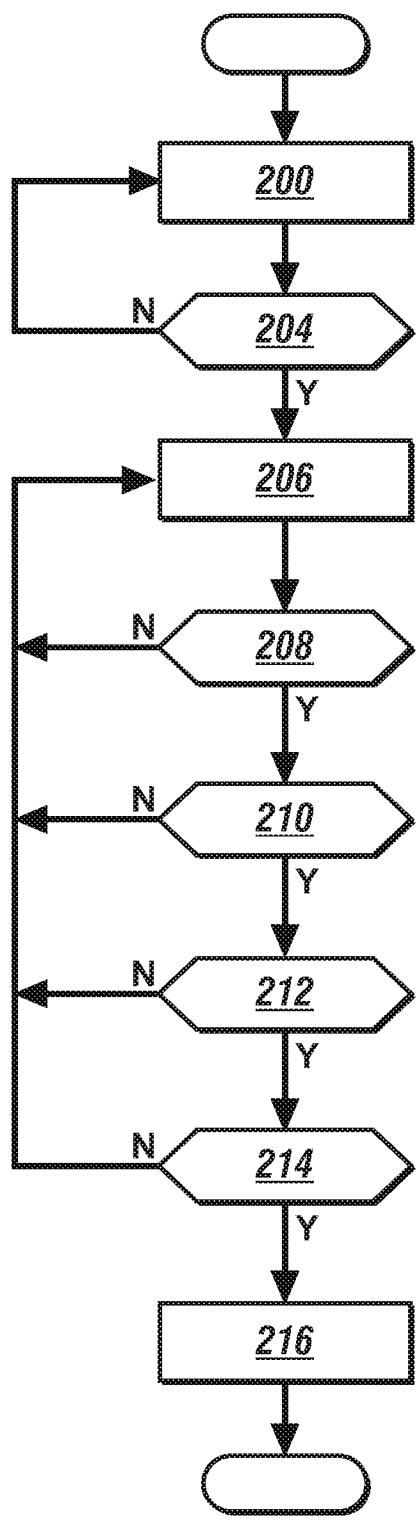
FIG. 2 is a process flow diagram illustrating a method of activating a thermal modulation mode ("TMM") of the control system illustrated in FIG. 1.

A method of operating the control system 10 will now be explained. Referring to FIG. 2, an exemplary process flow diagram illustrating an exemplary process of operating the control system 10 is generally indicated by reference number 200. Process 200 begins at step 202, where a control module 50 includes control logic for monitoring a temperature sensor 84 to determine an upstream temperature of an OC device 62. Process 200 may then proceed to step 204.

In step 204, the control module includes control logic for determining the temperature of the OC device 62 based on the temperature sensor 84. The control module 80 further includes control logic for determining if the temperature of the OC device 62 is a threshold amount above the respective light-off temperature of the OC device 62. Specifically, for example, in one embodiment if the light-off temperature of the OC device 62 is about 250° C., then the threshold amount above the respective light-off temperature of the OC device 62 would be about 30° C. In the event the OC device 62 is not above the threshold amount, then process 200 returns to step 202. In the event the OC device 62 is above the threshold amount, then process 200 may proceed to step 206.

In step 206, the control module 80 includes control logic for monitoring an intake mass air flow sensor 24. The control module 80 also includes control logic for calculating an exhaust flow rate located within the exhaust gas conduit 14 upstream of the OC device 62. The exhaust flow rate is based on the intake air mass of the engine 12, which is measured by the intake mass air flow sensor 24 as well as a fuel mass flow of the engine 12. In another embodiment, Process 200 may then proceed to step 208.

In step 208, the control module 80 includes control logic for determining if the exhaust flow rate is below a threshold value. In the event the exhaust flow rate is above the threshold value, process 200 returns to step 206. In the event the exhaust flow rate is below a threshold value, process 200 may then proceed to step 210.

In step 210, the control module 80 includes control logic for monitoring the engine 12 for engine fueling, and determining if the engine fueling is below a threshold value. It should be noted that in at least some embodiments, step 210 is optional, and may be omitted. In one embodiment, the threshold value for the engine fueling is at or below 30 cc/min. In the event that the engine fueling is not below the threshold value, process 200 may return to step 206. In the event the engine fueling is below the threshold value, then process 200 may then process to step 212.

In step 212, the control module 80 includes control logic for monitoring the engine 12 for engine torque and determining if the engine torque is below a threshold value. It should be noted that in at least some embodiments, step 212 is optional, and may be omitted. In the event that the engine torque is not below the threshold value, process 200 may return to step 206. In the event the engine torque is below the threshold value, then process 200 may then process to step 214.

In step 214, the control module includes control logic for monitoring a vehicle speed sensor 86 to determine vehicle speed, and includes control logic for determining if the vehicle speed drops below a threshold speed. It should be noted that step 214 is optional, and may be omitted in some embodiments. In the event that the vehicle speed does not drop below the threshold speed, process 200 may return to step 206. In the event the vehicle speed drops below the threshold speed, then process 200 may then process to step 216.

In step 216, control module 80 includes control logic for modulating the exhaust gas flow rate within the exhaust gas conduit 14 using an engine air intake mechanism. The engine air intake mechanism may be a throttle valve 36 or an EGR valve 60. In other words, the thermal modulation mode is activated. Process 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A control system for an internal combustion engine, comprising:
   an exhaust gas conduit in fluid communication with, and configured to receive an exhaust gas from the internal combustion engine;
   an oxidization catalyst ("OC") device in fluid communication with the exhaust gas conduit, wherein the OC device has an OC light-off temperature, and wherein the OC device is selectively activated to the light-off temperature to induce oxidization of the exhaust gas;
   a temperature sensor situated in the exhaust gas conduit upstream of the OC device, the temperature sensor monitoring an exhaust gas temperature;
   an intake mass air flow sensor for measuring an air mass entering the internal combustion engine;
   an engine air intake mechanism that is selectively activated to modulate the air mass entering the internal combustion engine; and a control module in communication with the temperature sensor, the intake mass air flow sensor, and the engine air intake mechanism, the control module having a memory for storing a threshold exhaust flow rate, comprising:
- a control logic for monitoring the intake mass air flow sensor and calculating an exhaust flow rate based on the air mass;
- a control logic for monitoring the temperature sensor for the exhaust gas temperature and calculating a temperature of the OC device based on the exhaust gas temperature at the OC device;
- a control logic for determining if the temperature of the OC device is a threshold amount above the light-off temperature of the OC device; and
- a control logic for activating the engine air intake mechanism to modulate the air mass if the exhaust flow rate is below the threshold exhaust flow rate and if the OC device is the threshold amount above the light-off temperature of the OC device.

2. The control system as recited in claim 1, wherein the engine air intake mechanism is one of an exhaust gas recirculation ("EGR") valve and a throttle valve.

3. The control system as recited in claim 1, wherein the control module includes control logic for activating the engine air intake mechanism based on a current value of the air mass.

4. The control system as recited in claim 1, wherein the control module includes control logic for controlling the engine intake air mechanism based on a specific duty cycle.

5. The control system as recited in claim 1, wherein the control module is in communication with a vehicle speed sensor, and wherein the control module includes control logic for determining a speed of the vehicle based on a signal sent from the vehicle speed sensor.

6. The control system as recited in claim 5, wherein the control module includes control logic for determining if the speed of the vehicle is below a threshold vehicle speed, and wherein the control module includes control logic for activating the engine air intake mechanism to modulate the air mass if the speed of the vehicle is below the threshold vehicle speed.

7. The control system as recited in claim 1, wherein the control module includes control logic for monitoring the internal combustion engine for an engine RPM and an engine fueling, wherein the control module includes control logic for activating the engine air intake mechanism to modulate the air mass if the engine fueling is below a threshold fueling value.

8. The control system as recited in claim 1, wherein the control module includes control logic for monitoring the internal combustion engine for an engine RPM and an engine torque, wherein the control module includes control logic for activating the engine air intake mechanism to modulate the air mass if the engine torque is below a threshold torque value.

9. The control system as recited in claim 1, further comprising an oxygen sensor in fluid communication with the exhaust gas conduit, the control module in communication with the oxygen sensor, and wherein the control module includes control logic for monitoring the oxygen sensor for an oxygen concentration in the exhaust gas.

10. The control system as recited in claim 9, wherein the control module includes control logic for calculating the intake air mass of the internal combustion engine based on the oxygen concentration in the exhaust gas, and wherein the control module includes control logic for modulating the engine air intake mechanism based on the intake air mass calculated from the oxygen concentration.

11. The control system as recited in claim 1, wherein the control module includes control logic for calculating the intake air mass of the internal combustion engine based on the exhaust gas temperature.

12. The control system as recited in claim 11, wherein the control module includes control logic for activating the engine air intake mechanism to modulate the air mass based on the intake air mass of the internal combustion engine calculated from the exhaust gas temperature.

13. A method of controlling an internal combustion engine, comprising:
- providing an oxidization catalyst ("OC") device in fluid communication with an exhaust gas conduit, wherein the OC device has an OC light-off temperature, and wherein the OC device is selectively activated to the light-off temperature to induce oxidization of an exhaust gas;
- monitoring an exhaust gas temperature by a temperature sensor, the temperature sensor situated in the exhaust gas conduit upstream of the OC device;
- measuring an air mass entering the internal combustion engine by an intake mass air flow sensor;
- providing an engine air intake mechanism that is selectively activated to modulate the air mass entering the internal combustion engine;
- monitoring the intake mass air flow sensor and calculating an exhaust flow rate based on the air mass by a control module;
- calculating a temperature of the OC device based on the exhaust gas temperature at the OC device by the control module;
- determining if the temperature of the OC device is a threshold amount above the light-off temperature of the OC device by the control module; and
- activating the engine air intake mechanism to modulate the air mass if the exhaust flow rate is below a threshold exhaust flow rate stored in a memory of the control module, and if the temperature of the OC device is the threshold amount above the light-off temperature of the OC device.

14. The method as recited in claim 13, wherein the engine air intake mechanism is one of an exhaust gas recirculation ("EGR") valve and a throttle valve.

15. The method as recited in claim 13, comprising activating the engine air intake mechanism based on a current value of the air mass by the control module.

16. The method as recited in claim 13, comprising controlling the engine intake air mechanism based on a specific duty cycle by the control module.

17. The method as recited in claim 13, comprising determining a speed of the vehicle based on a signal sent from a vehicle speed sensor by the control module.

18. The method as recited in claim 17, comprising determining if the speed of the vehicle is below a threshold vehicle speed by the control module, and wherein the control module includes control logic for activating the engine air intake mechanism to modulate the air mass if the speed of the vehicle is below the threshold vehicle speed.

19. The method as recited in claim 13, comprising monitoring the internal combustion engine for an engine RPM and an engine fueling by the control module, wherein the control module includes control logic for activating the engine air intake mechanism to modulate the air mass if the engine fueling is below a threshold fueling value.

20. The method as recited in claim 13, comprising monitoring the internal combustion engine for an engine RPM and an engine torque by the control module, wherein the control module includes control logic for activating the engine air intake mechanism to modulate the air mass if the engine torque is below a threshold torque value.

* * * * *